(12) United States Patent
Chang et al.

(10) Patent No.: US 8,125,943 B2
(45) Date of Patent: Feb. 28, 2012

(54) METHOD FOR POSITIONING USER EQUIPMENT ACCESSING MULTIPLE MOBILE NETWORKS

(75) Inventors: Chia-lan Chang, Sanchong (TW); Chia-Chen Hsu, Taipei (TW); Li-Chi Huang, Chung-Ho (TW)

(73) Assignee: Mediatek Inc., Hsin-Chu (TW)

( * ) Notice: Subject to any disclaimer, the term of this patent is extended or adjusted under 35 U.S.C. 154(b) by 485 days.

(21) Appl. No.: 12/388,546

(22) Filed: Feb. 19, 2009

(65) Prior Publication Data

US 2010/0208649 A1 Aug. 19, 2010

(51) Int. Cl.
*H04W 24/00* (2009.01)
*G01S 19/42* (2010.01)
(52) U.S. Cl. ............... 370/328; 455/456.1; 342/357.25; 701/215
(58) Field of Classification Search .................. None
See application file for complete search history.

(56) References Cited

U.S. PATENT DOCUMENTS

| 6,411,811 | B2 | 6/2002 | Kingdon et al. | |
|---|---|---|---|---|
| 7,069,023 | B2 | 6/2006 | Maanoja et al. | |
| 7,317,910 | B2 | 1/2008 | Niemenmaa et al. | |
| 2001/0002822 | A1* | 6/2001 | Watters et al. | 342/357.1 |
| 2008/0287139 | A1* | 11/2008 | Carlson et al. | 455/456.1 |
| 2009/0073030 | A1* | 3/2009 | Hansen et al. | 342/357.1 |
| 2009/0131075 | A1* | 5/2009 | Mazlum et al. | 455/456.1 |
| 2010/0039320 | A1* | 2/2010 | Boyer et al. | 342/357.09 |

* cited by examiner

*Primary Examiner* — Min Jung
(74) *Attorney, Agent, or Firm* — Thomas|Kayden (57) ABSTRACT

The invention provides a method for positioning a user equipment. First, a plurality of wireless links between the user equipment and a plurality of mobile networks are established. A plurality of first location information sets describing a location of the user equipment are then obtained from the mobile networks through the wireless links. The first location information sets are then converted to a plurality of second location information sets with a predetermined format. The second location information sets are then combined to estimate a third location information set describing the location of the user equipment.

16 Claims, 11 Drawing Sheets

METHOD FOR POSITIONING USER EQUIPMENT ACCESSING MULTIPLE MOBILE NETWORKS

BACKGROUND OF THE INVENTION

1. Field of the Invention

The invention relates to mobile networks, and more particularly to positioning a user equipment accessing multiple mobile networks.

2. Description of the Related Art

User equipments, such as a notebook or a cell phone, are wirelessly connected to a mobile network for communication. When user equipment is connected to a mobile network, the mobile network requires location information of the user equipment, to provide the user equipment with a communication link with better communication quality. Additionally, a user equipment also requires its own location information, to adjust its position to obtain a wireless link with better communication quality. A method for positioning user equipment connected to a mobile network is therefore required.

Figure 1A:
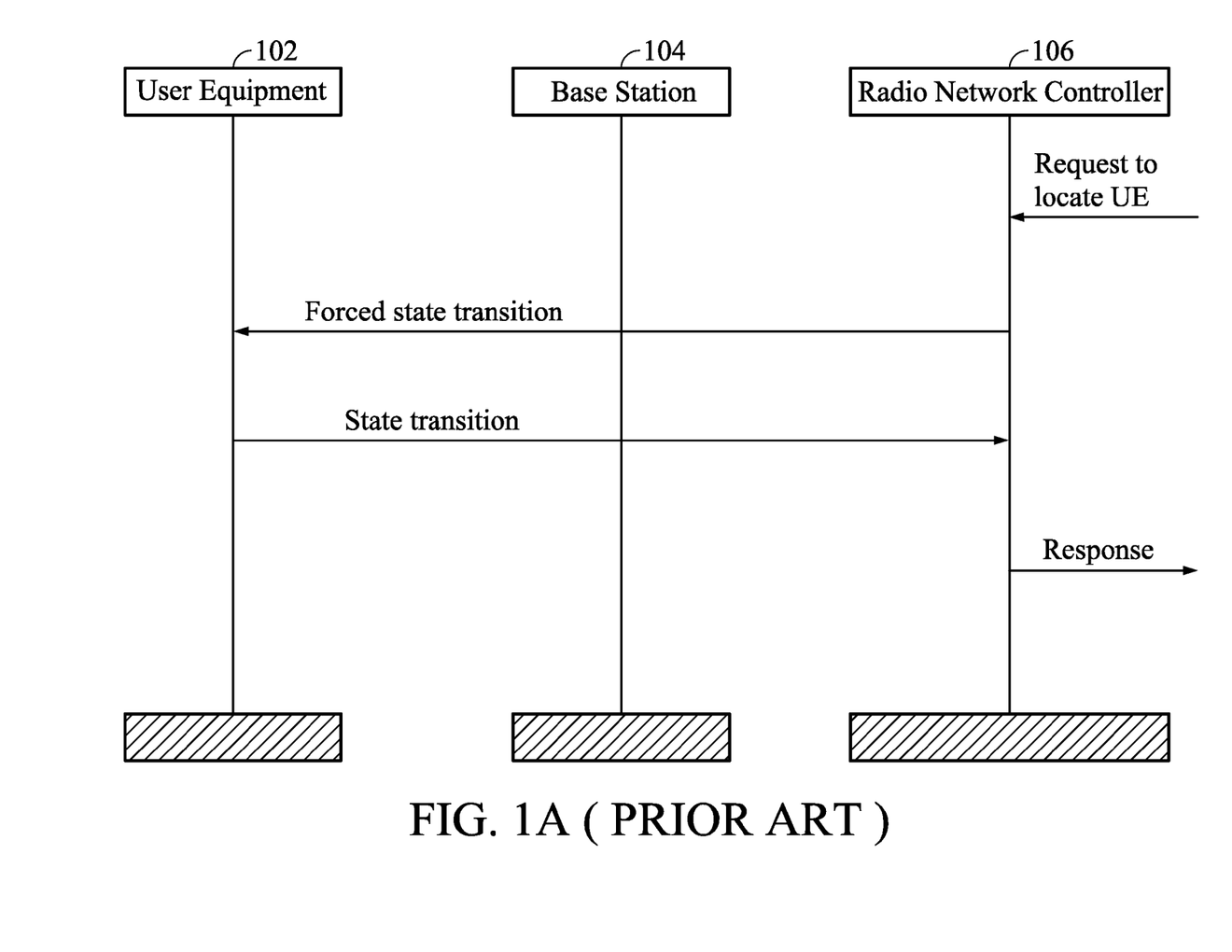
FIG. 1A is a schematic diagram of a cell-identity method for positioning a user equipment.

Conventional methods for positioning a user equipment comprises a cell-identity method, an observed time difference of arrival (OTDOA) method, an uplink-time difference of arrival (UTDOA) method, and a network-assisted GPS positioning (A-GPS) method. Referring to FIG. 1A, a schematic diagram of a cell-identity method for positioning a user equipment 102 is shown. Assume a mobile network comprises a base station 104 and a radio network controller (RNC) 106. When the user equipment 102 is connected to the mobile network, the mobile network sends a request for locating the user equipment 102 to the radio network controller 106. The radio network controller 106 then sends a state transition signal to the user equipment 102 via a base station 104 connected to the user equipment 102. After the base station 104 responds to the state transition signal with a state transition success signal, the radio network controller 106 can identify the base station 104 connected to the user equipment 102, and determine the location of the user equipment 102 according to a service coverage area of the base station 104.

Figure 1B:
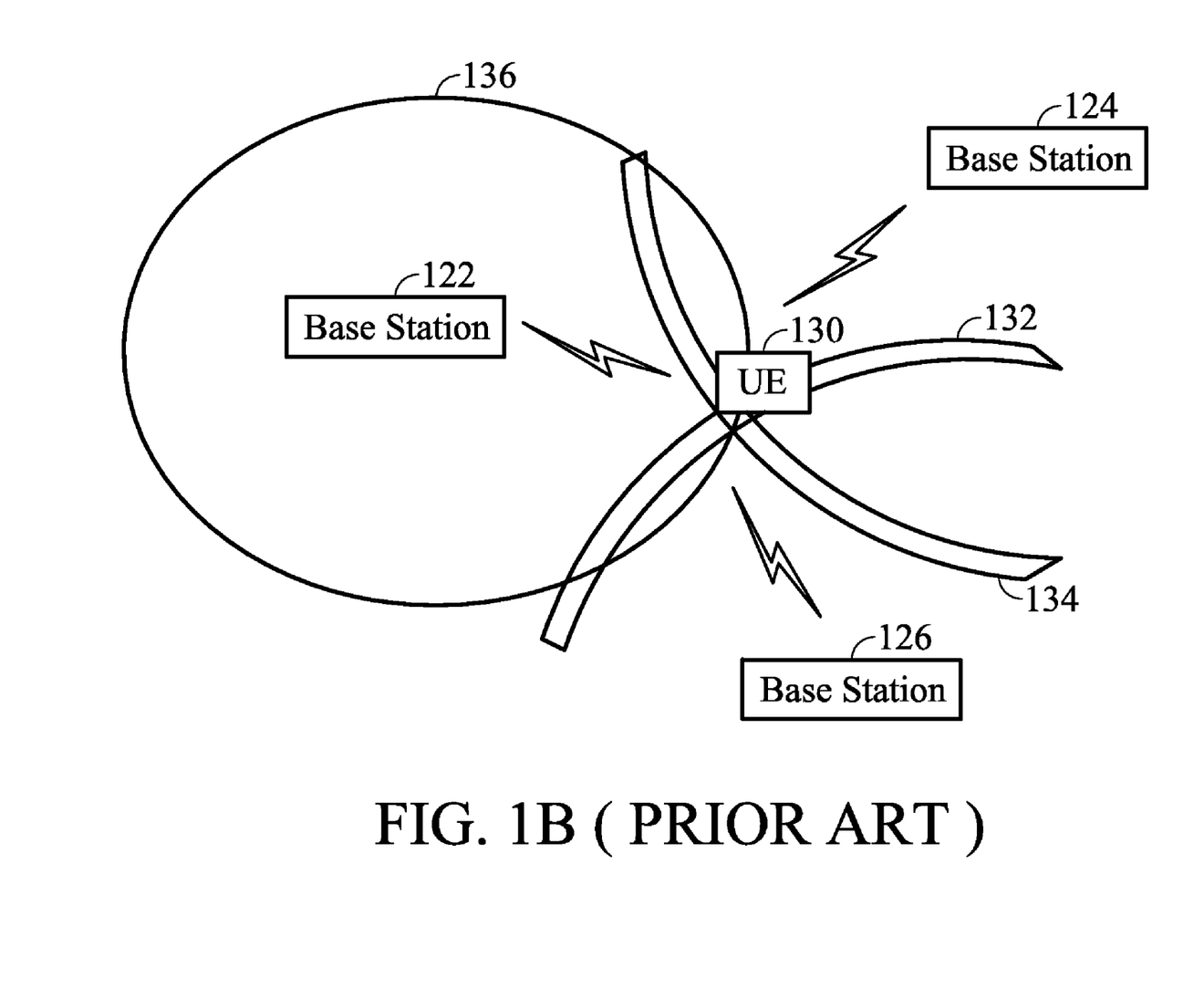
FIG. 1B is a schematic diagram of an observed time difference of arrival (OTDOA) method for positioning a user equipment.

Referring to FIG. 1B, a schematic diagram of an observed time difference of arrival (OTDOA) method for positioning a user equipment 130 is shown. Assume that a mobile network comprises three base stations 122, 124, and 126 located in the vicinity of the user equipment 130. The base stations 122, 124, and 126 broadcast a signal and the user equipment 130 derives its location according to the signals broadcasted by the three base stations. The variable distances between the user equipment 130 and the base stations 122, 124, and 126 cause the signals broadcasted by the base stations 122, 124, and 126 having different signal delays. A first phase difference exists between the signals broadcasted by the base stations 122 and 126, and a second phase difference exists between the signals broadcasted by the base stations 124 and 126.

A hyperboloid 132 corresponding to probable locations of the user equipment 130 is derived according to the first phase difference and the locations of the base stations 122 and 126, and a hyperboloid 134 corresponding to probable locations of the user equipment 130 is derived according to the second phase difference and the locations of the base stations 124 and 126. The two hyperboloids 132 and 134 are drawn with widths to show the errors induced by calculating the probable locations fom the phase difference and the base station locations. A cross point of the hyperboloids 132 and 134 indicates a most probable position of the user equipment 130. The OTDOA method shown in FIG. 1B estimates a position of user equipment according to phase difference between signals emitted by the base stations of a mobile network. Similarly, an uplink-time difference of arrival (UTDOA) method estimates a position of a user equipment according to phase difference between signals received by base stations of a mobile network based on similar algorithms.

Figure 1C:
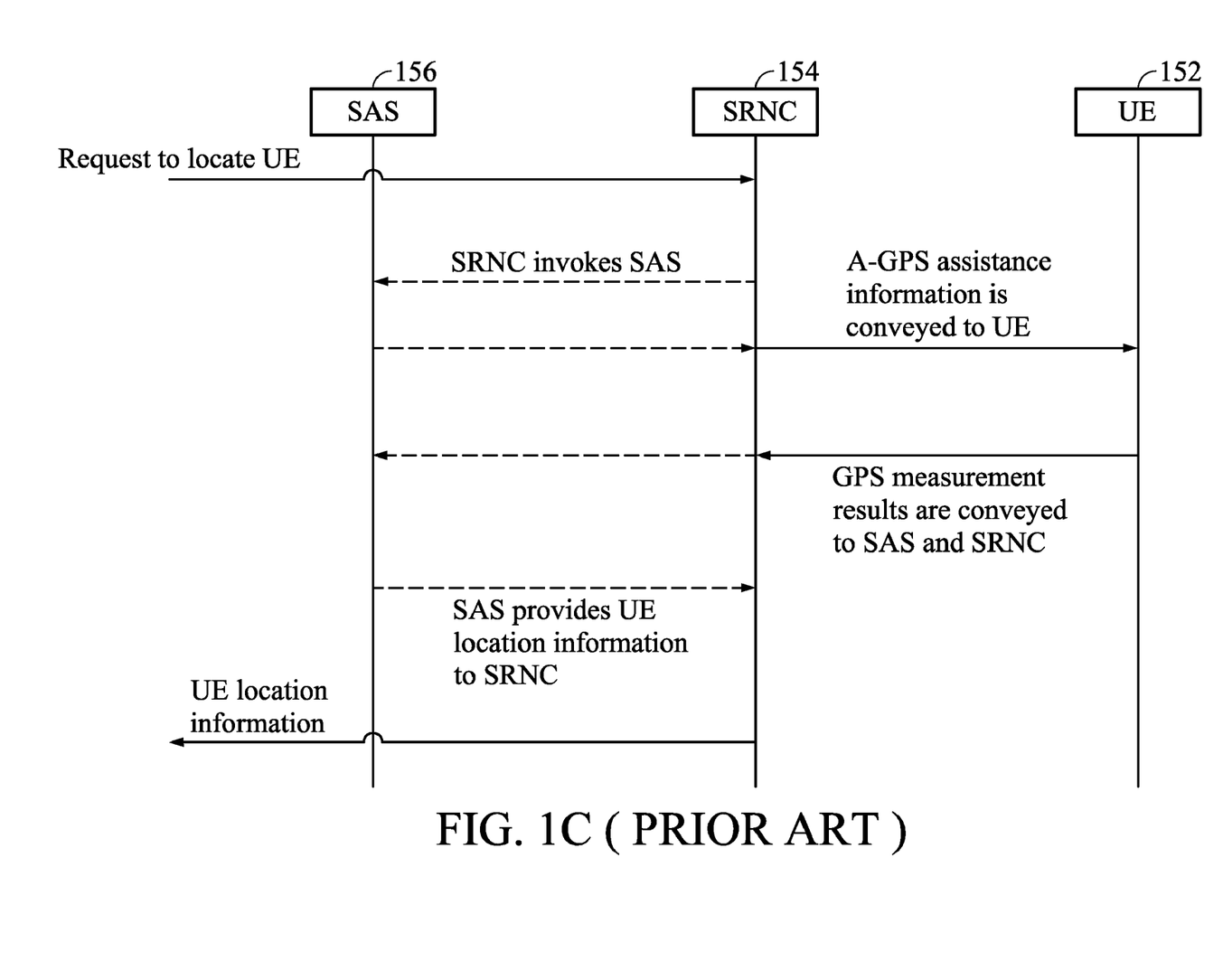
FIG. 1C is a schematic diagram of a network-assisted GPS positioning (A-GPS) method for positioning a user equipment.

Referring to FIG. 1C, a schematic diagram of a network-assisted GPS positioning (A-GPS) method for positioning a user equipment 152 is shown. A mobile network comprises a serving radio network controller (SRNC) 154 and a Stand-Alone Serving-mobile-location-center (SAS) 156. The user equipment 152 comprises a global positioning system (GPS) module. The mobile network first sends a request to the SRNC 154 for positioning the user equipment 152. The SRNC 154 then collects network information about the user equipment 152 and sends an SAS invoke signal comprising the network information about the user equipment 152 to the SAS 156. The SAS 156 then delivers A-GPS assistance information to the user equipment 152 in response to the SAS invoke signal. The user equipment 152 then performs GPS measurement with the aid of A-GPS assistance information and sends the GPS measurement to the SAS 156 through the SRNC 154. The SAS 156 then calculates location information of the user equipment 152 according to the GPS measurement and then provides the SRNC 154 with location information of the user equipment 152. Finally, the SRNC 154 forwards the location information to the mobile network.

Figure 2:
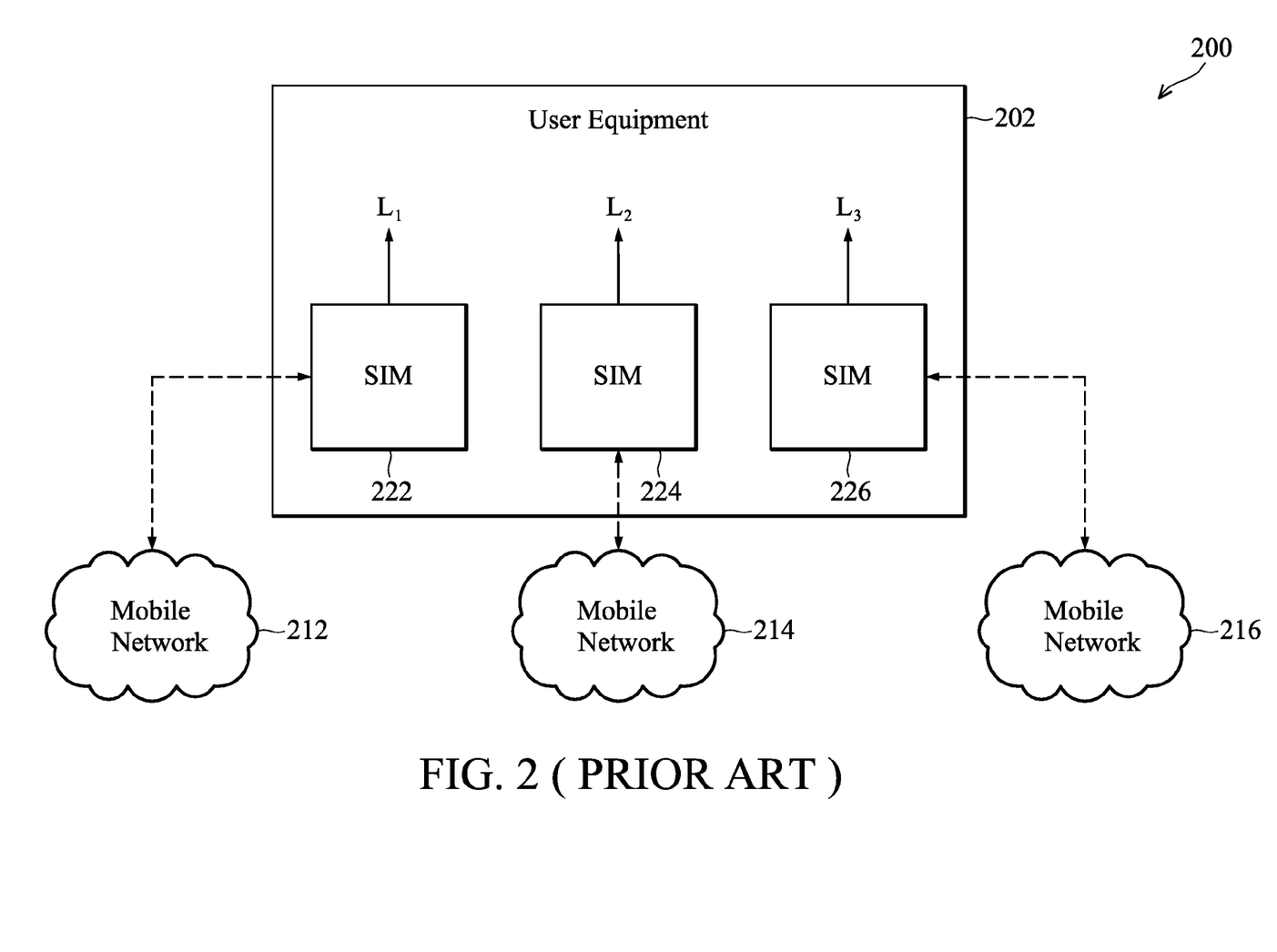
FIG. 2 is a schematic diagram of a user equipment capable of accessing three mobile networks.

The conventional cell-identity method, OTDOA method, UTDOA method, and A-GPS method provides location information of a user equipment with limited precision. User equipment often can access more than one mobile network and obtain location information from more than one mobile network. Referring to FIG. 2, a schematic diagram of user equipment 202 capable of accessing three mobile networks 212, 214, and 216 is shown. The user equipment 202 comprises three subscriber identity modules (SIM) 222, 224, and 226. After the user equipment 202 is connected to one or more of the mobile networks 212, 214, and 216, the user equipment 202 may obtain more than one set of location information (e.g. $L_1$, $L_2$, and $L_3$) from the mobile networks 212, 214, and 216. The user equipment 202, however, only relies on one set of the location information $L_1$, $L_2$, or $L_3$, which does not enjoy the benefit of accessing multiple mobile networks.

BRIEF SUMMARY OF THE INVENTION

The invention provides a method for positioning user equipment. First, a plurality of wireless links between the user equipment and a plurality of mobile networks are established. A plurality of first location information sets describing a location of the user equipment are then obtained from the mobile networks through the wireless links. The first location information sets are then converted to a plurality of second location information sets with a predetermined format. The second location information sets are then combined to estimate a third location information set describing the location of the user equipment with better precision than that of the first location information sets.

The invention provides user equipment. In one embodiment, the user equipment is capable of accessing a plurality of mobile networks, and comprises a plurality of location information generating modules and an information combination module. The plurality of location information generating modules establishes a plurality of wireless links between the user equipment and the mobile networks, and obtains a plurality of first location information sets describing a location of the user equipment from the mobile networks through the wireless links. The information combination module then converts the first location information sets to a plurality of second location information sets with a predetermined format, and combines the second location information sets to estimate a third location information set describing the location of the user equipment with better precision than that of the first location information sets.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
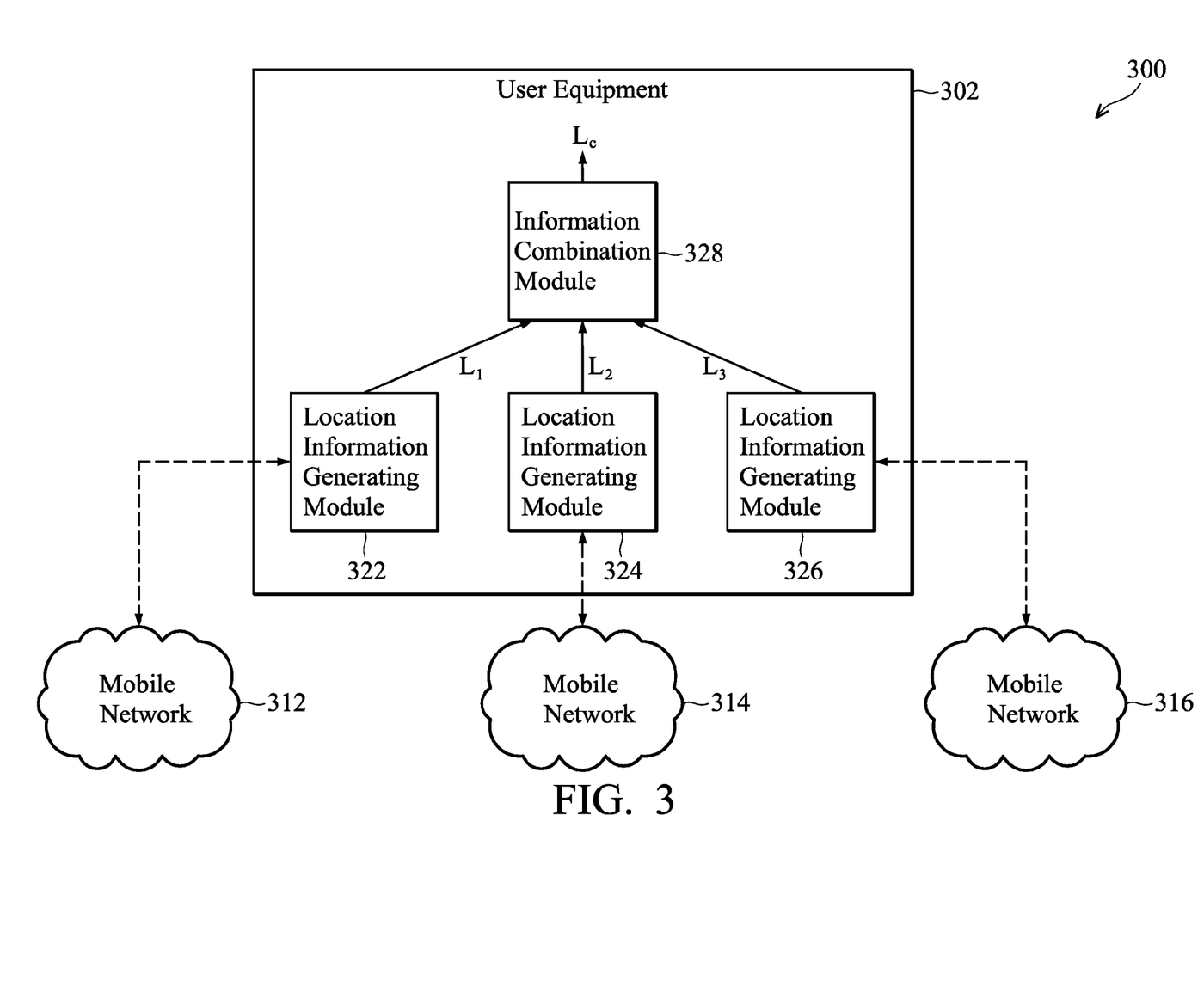
FIG. 3 is a block diagram of a user equipment performing positioning according to a plurality of mobile networks according to an embodiment of the invention.

Referring to FIG. 3, a block diagram of a user equipment 302 performing positioning by combining location information of a plurality of mobile networks 312, 314, and 316 according to an embodiment of the invention is shown. In one embodiment, the user equipment 302 is a cell phone, a notebook, or a personal digital assistant (PDA), and the mobile networks 312, 314, and 316 are public land mobile networks (PLMN). The user equipment 302 comprises a plurality of location information generating modules 322, 324, and 316 and an information combination module 328. Each of the location information generating modules 322, 324, and 316 corresponds to one of the mobile networks 312, 314, and 316 and can establish a wireless link between the user equipment 302 and the corresponding mobile networks 312, 314, or 316. After the location information generating modules 322, 324, and 326 establishes the wireless links, the user equipment 302 can then access the mobile networks 312, 314, and 316 via the wireless links. Each of location information sets $L_1$, $L_2$, and $L_3$ is estimated or notified from a corresponding mobile network. In some embodiments, one or more of the mobile networks 312, 314, and 316 generate one or more location information sets $L_1$, $L_2$, and $L_3$ describing a location of the user equipment 302, and corresponding location information generating modules 322, 324, and 316 obtain the location information sets $L_1$, $L_2$, and $L_3$ from the mobile networks 312, 314, and 316 through the established wireless links. In some embodiments, one or more of the mobile networks 312, 314, and 316 generates one or more location information sets $L_1$, $L_2$, and $L_3$ according to a cell-identity algorithm shown in FIG. 1A, an observed time difference of arrival (OTDOA) algorithm shown in FIG. 1B, an uplink-time difference of arrival (UTDOA) algorithm, or a network-assisted GPS positioning (A-GPS) algorithm shown in FIG. 1C.

Figure 4:
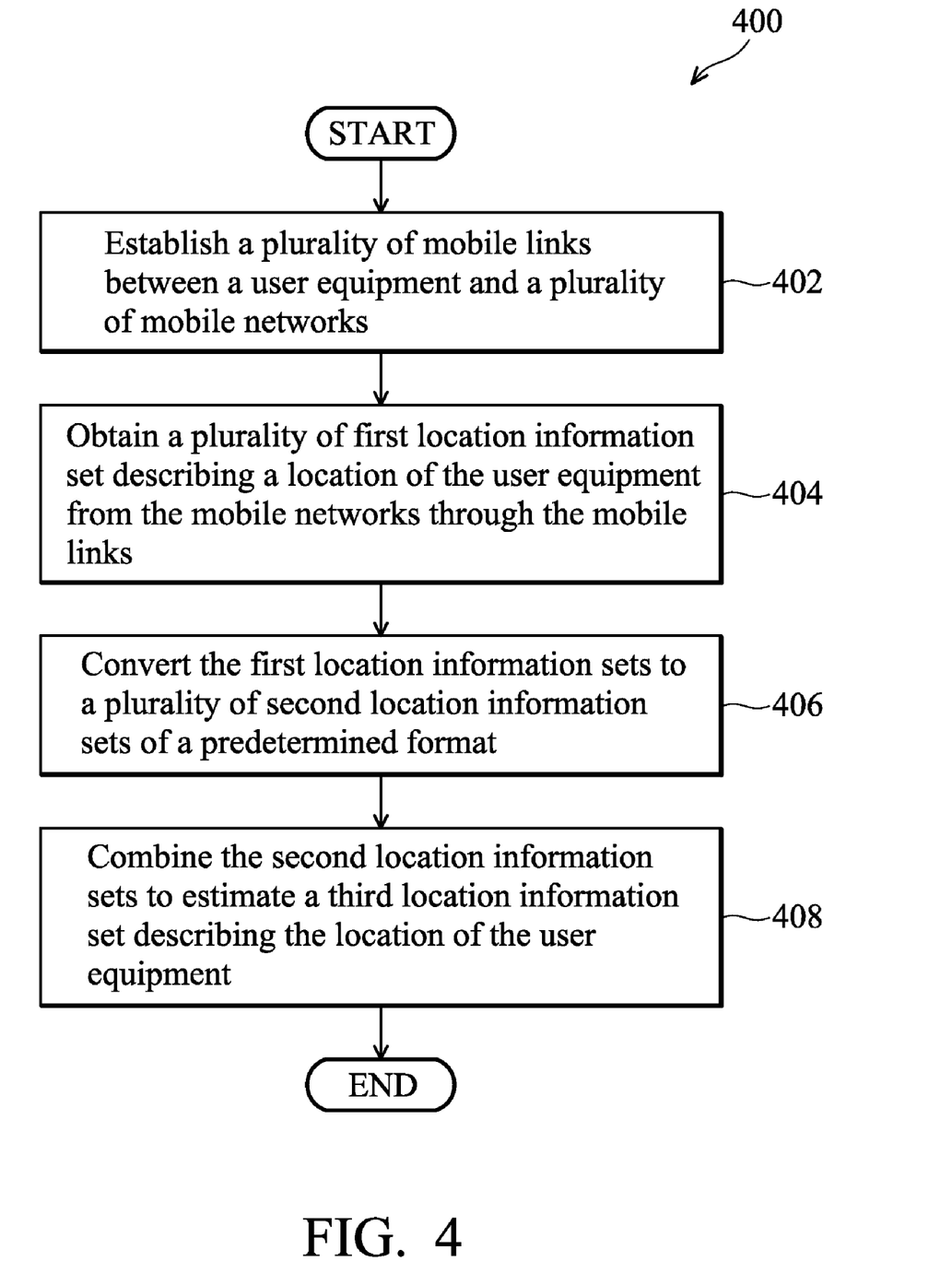
FIG. 4 is a flowchart of a method for positioning a user equipment according to an embodiment of the invention.

The information combination module 328 then combines the location information sets $L_1$, $L_2$, and $L_3$ obtained from the location information generating modules 322, 324, and 326 to generate a combined location information set $L_c$ with precision higher than those of the original location information sets $L_1$, $L_2$, and $L_3$. Referring to FIG. 4, a flowchart of a method for positioning the user equipment 302 according to an embodiment of the invention is shown. After the location information generating modules 322, 324, and 326 establish wireless links (step 402) and obtain the location information sets $L_1$, $L_2$, and $L_3$ from the mobile networks 312, 314, and 316 (step 404), the information combination module 328 then converts the location information sets $L_1$, $L_2$, and $L_3$ to a plurality of location information sets $L_1'$, $L_2'$, and $L_3'$ with a predetermined format (step 406). The information combination module 328 then combines the location information sets $L_1'$, $L_2'$, and $L_3'$ to estimate the combined location information set $L_c$ describing the location of the user equipment 302 with high precision (step 408). The user equipment 302 can then utilize its position according to the combined location information set $L_c$ for various applications or it may improve communication quality of the wireless links. In addition, the user equipment 302 can also deliver the combined location information set $L_c$ to the mobile networks 312, 314, and 316, and the mobile networks 312, 314, and 316 can then improve communication quality of the wireless links to the user equipment 302 according to the combined location information set $L_c$. Thus, the user equipment 302 has a better performance than that of conventional user equipment 202, as shown in FIG. 2.

Figure 5:
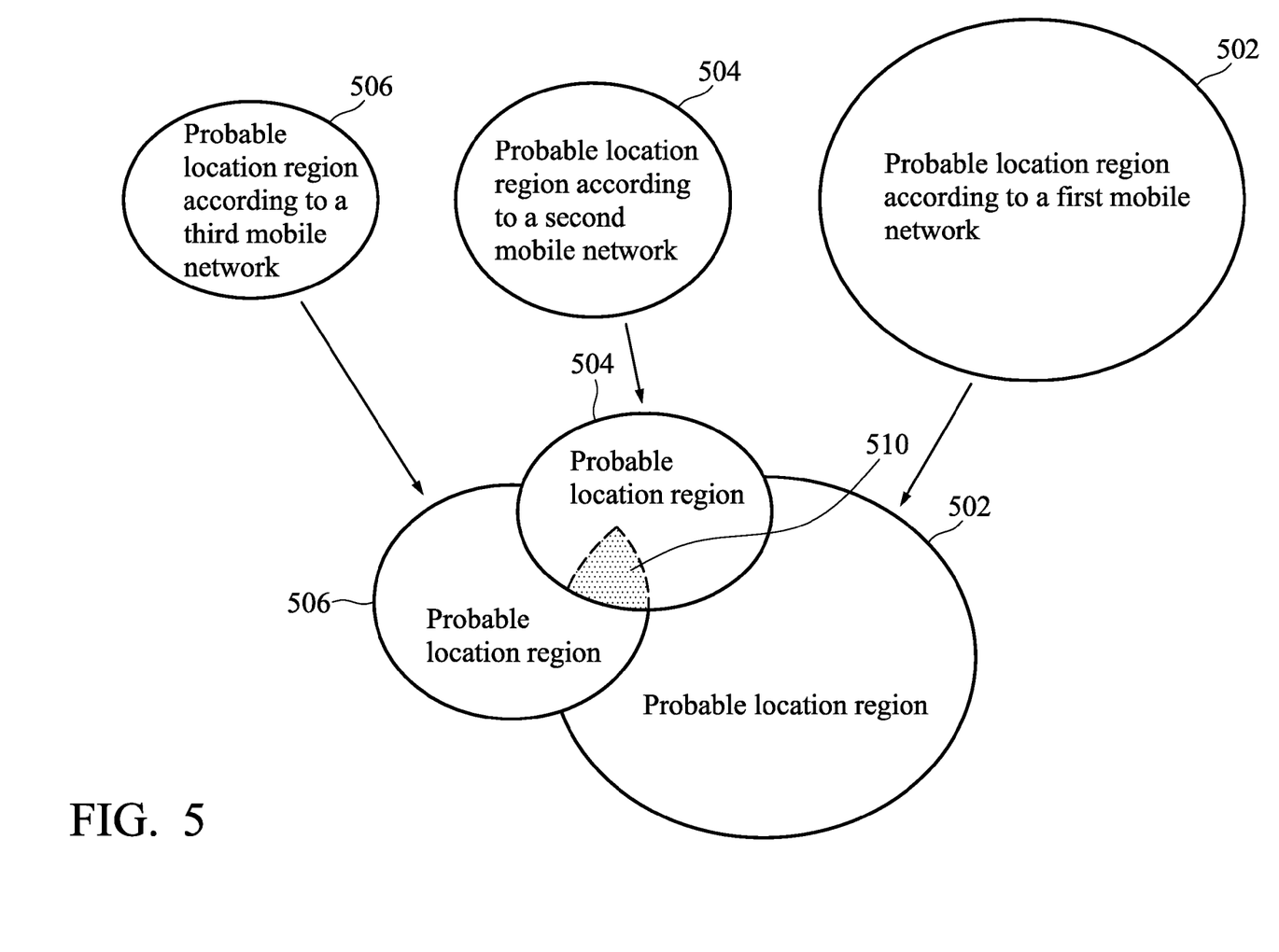
FIG. 5 is a schematic diagram of spherical probable location regions determined according to location information sets generated by multiple mobile networks.

In one embodiment, the information combination module 328 converts the location information sets $L_1$, $L_2$, and $L_3$ at step 406 to location information sets $L_1'$, $L_2'$, and $L_3'$ comprising longitude information, latitude information, altitude information, and radius information. Each of the converted location information sets $L_1'$, $L_2'$, and $L_3'$ therefore defines a spherical probable location region of the user equipment, wherein the spherical probable location region has a spherical center located at a point determined by the longitude information, the latitude information, and the altitude information, and a radius determined by the radius information. Referring to FIG. 5, a schematic diagram of spherical probable location regions 502, 504, and 506 determined according to location information sets $L_1$, $L_2$, and $L_3$ generated by the mobile networks 322, 324, and 326 is shown. The spherical probable location regions 502, 504, and 506 have an intersection 510 spatially overlapped by the three spherical probable location regions 502, 504, and 506. The information combination module 328 then determines the overlapped region 510 of the spherical probable location regions 502, 504, and 506 and then outputs the overlapped region 510 as the combined location information set $L_c$ at step 408.

For example, when the mobile network 312 generates location information $L_1$ according to an OTDOA algorithm, the location information $L_1$ comprises a measurement result comprising a measured longitude, a measured latitude, and a measured altitude, and a measurement accuracy indicating precise accuracy probability of the measurement result. The information combination module 328 then converts the measurement accuracy to radius information indicating a radius of a circle covering probable locations of the user equipment 302 with a predetermined confidence probability level such as 95%. The measured longitude, the measured latitude, the measured altitude, and the radius information thus make up the converted location information sets $L_1'$, and a spherical probable location region 502 defined by the converted location information set $L_1'$ is obtained.

For another example, when the mobile network 314 generates location information $L_2$ according to a cell-identity algorithm, the location information $L_2$ comprises a base station location, an estimated distance from the base station to the user equipment, and an antenna beam angle indicating orientation of the use equipment. The information combination module 328 then converts the base station location to the longitude information, the latitude information, and the altitude information of the converted location information sets $L_2'$. The information combination module 328 also converts the estimated distance to the radius information of the converted location information sets $L_2'$. With addition of the antenna beam angle, a cone-shaped probable location region 504 defined by the converted location information set $L_2'$ is obtained.

In another embodiment, the information combination module 328 converts the location information sets $L_1$, $L_2$, and $L_3$ at step 406 to location information sets $L_1'$, $L_2'$, and $L_3'$ comprising longitude information, latitude information, altitude information, and accuracy information defining accuracy probability of the location information sets $L_1'$, $L_2'$, and $L_3'$. The information combination module 328 then weights the longitude information, the latitude information, and the altitude information of the location information sets $L_1'$, $L_2'$, and $L_3'$ according to the accuracy information of the corresponding location information sets $L_1'$, $L_2'$, and $L_3'$ to obtain the weighted location information sets $L_1''$, $L_2''$, and $L_3''$. The information combination module 328 averages the weighted location information sets $L_1''$, $L_2''$, and $L_3''$ to obtain the combined location information set $L_c$. In one embodiment, the combined location information set $L_c$ is obtained according to the following algorithm:

$$L_c = \frac{P_1 \times A_1 + P_2 \times A_2 + P_3 \times A_3}{A_1 + A_2 + A_3},$$

wherein $A_1$, $A_2$, and $A_3$ are respectively the accuracy information of the corresponding location information sets $L_1'$, $L_2'$, and $L_3'$, and $P_1$, $P_2$, and $P_3$ are respectively the position vectors defined by the longitude information, latitude information, and altitude information of the location information sets $L_1'$, $L_2'$, and $L_3'$.

Figure 6A:
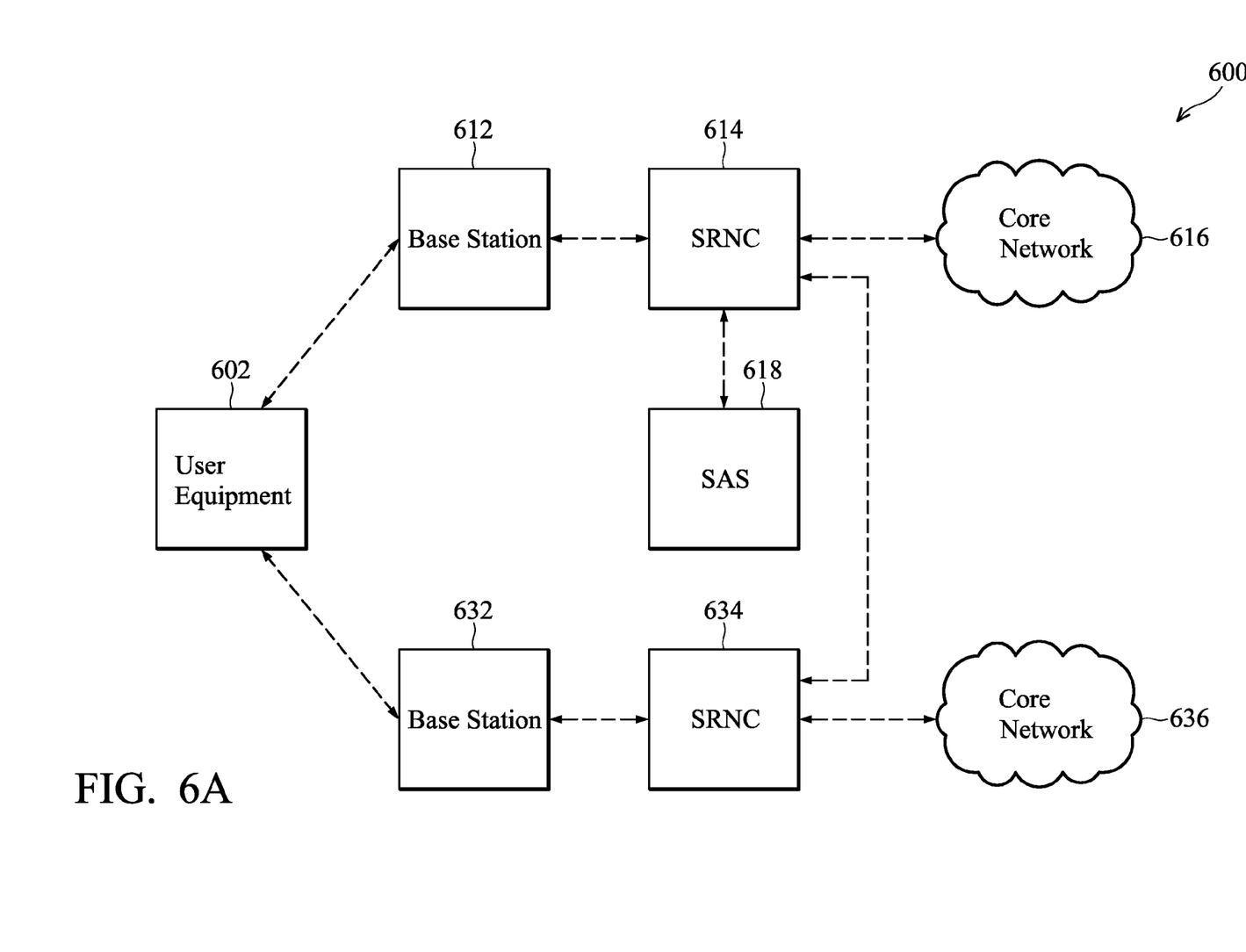
FIG. 6A is a block diagram of a network-assisted GPS positioning (A-GPS) system comprising multiple mobile networks according to an embodiment of the invention.

When the user equipment 302 comprises a global positioning system (GPS) module, a Stand-Alone Serving-mobile-location-center (SAS) of the mobile networks 312, 314, or 316 may generate A-GPS assistance information to supplement positioning of the user equipment 302 as shown in FIG. 1C. The SAS 156 in FIG. 1C, however, generates A-GPS assistance information according to network information provided by a radio network controller (RNC) 154 of one of the mobile networks 312, 314, and 316. If an SAS generates A-GPS assistance information according to network information provided by multiple mobile networks 312, 314, and 316, precision of positioning of the user equipment 302 may be improved. Referring to FIG. 6A, a block diagram of a network-assisted GPS positioning (A-GPS) system 600 comprising multiple mobile networks according to an embodiment of the invention is shown. A first mobile network comprises a base station 612, a serving radio network controller (SRNC) 614, an SAS 618, and a core network 616. A second mobile network comprises a base station 632, a serving radio network controller (SRNC) 634, and a core network 636. The user equipment 602 is wirelessly connected to the first mobile network and the second mobile network.

Figure 6B:
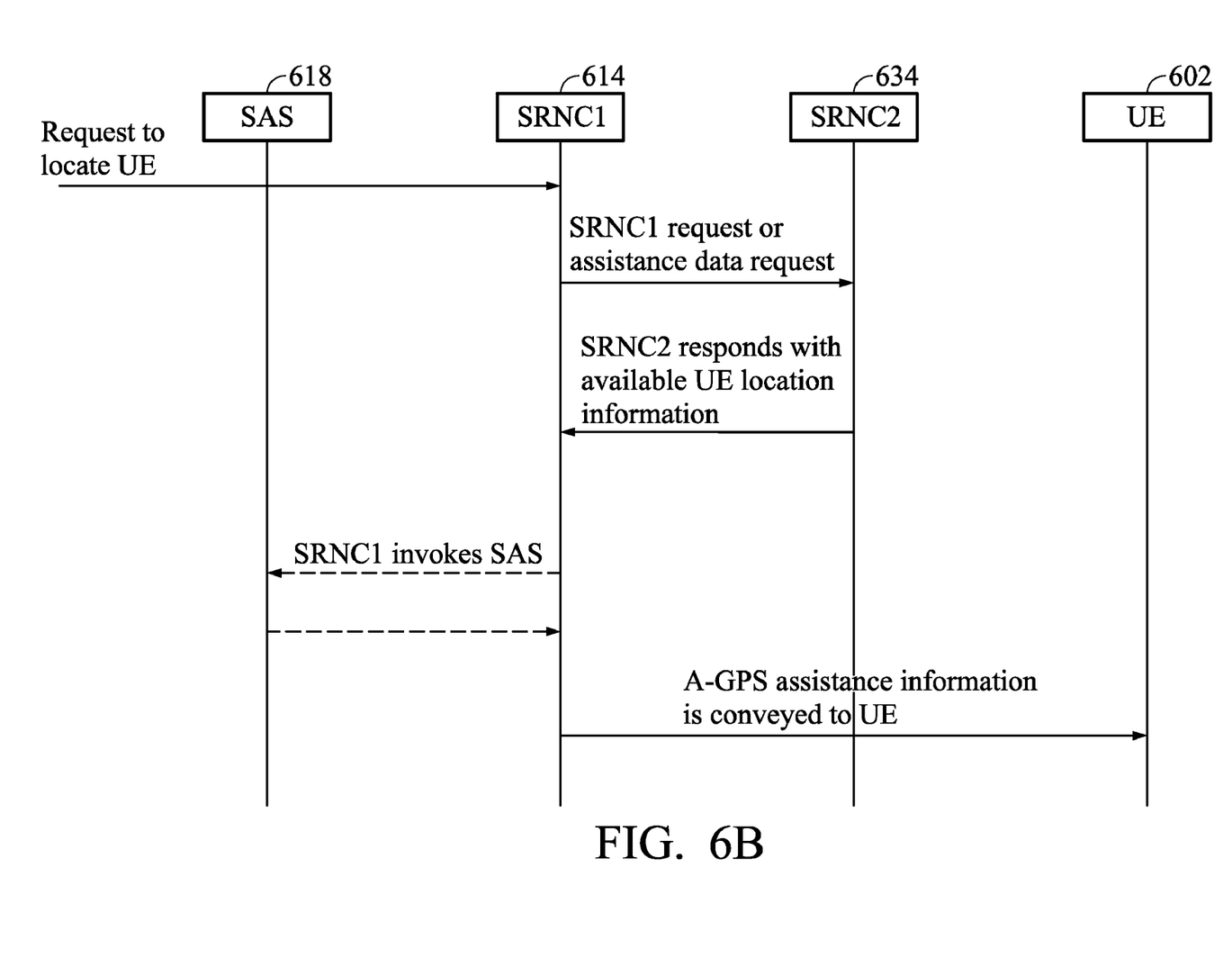
FIG. 6B is a schematic diagram of a network-assisted GPS positioning (A-GPS) method for positioning a user equipment according to an embodiment of the invention.

Referring to FIG. 6B, a schematic diagram of a network-assisted GPS positioning (A-GPS) method for positioning the user equipment 602 according to an embodiment of the invention is shown. When the core network 616 of the first mobile network generates a request for positioning the user equipment 602, the SRNC 614 of the first mobile network sends an assistance data request to the SRNC 634 of the second mobile network. The SRNC 634 then sends second network information about the user equipment 602 in the second mobile network to the SRNC 614 in response to the assistance data request. The SRNC 614 then collects first network information about the user equipment 602 in the first mobile network, and then combines the first network information with the second network information to obtain third network information with a higher precision then those of the first network information and the second network information. The SRNC 614 then sends the third network information to the SAS 618, and the SAS 618 generates A-GPS assistance information according to the third network information. In some other embodiments, A-GPS assistance information is computed by the SRNC 614. The SRNC 614 then forwards the A-GPS assistance information to the user equipment 602 as a supplement to positioning the user equipment 602. Thus, the A-GPS system 600 positions the user equipment 602 with a higher precision than the A-GPS system shown in FIG. 1C.

Figure 7A:
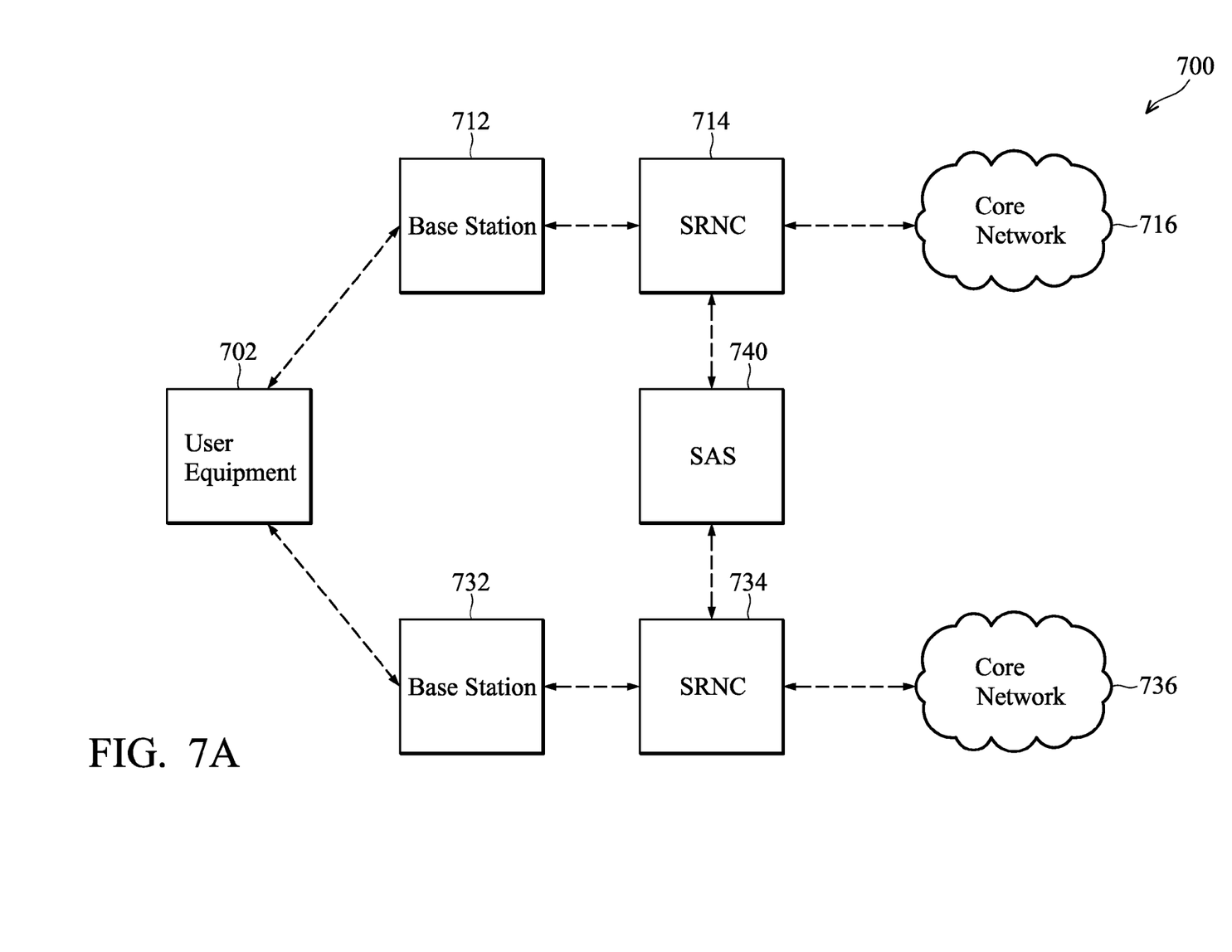
FIG. 7A is a block diagram of an A-GPS system comprising multiple mobile networks according to an embodiment of the invention.
Figure 7B:
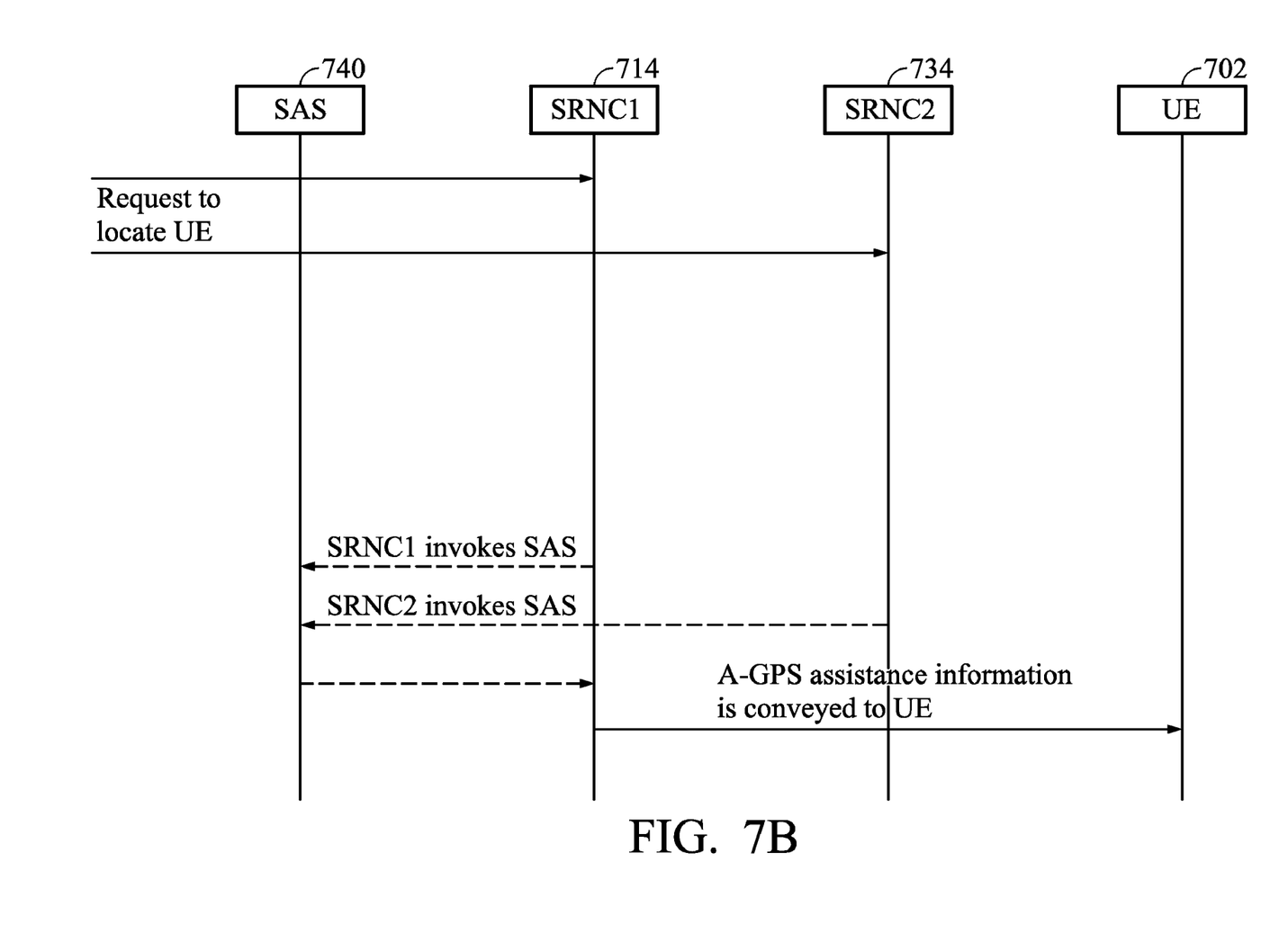
FIG. 7B is a schematic diagram of an A-GPS method for positioning a user equipment according to an embodiment of the invention.

Referring to FIG. 7A, a block diagram of a network-assisted GPS positioning (A-GPS) system 700 comprising multiple mobile networks according to an embodiment of the invention is shown. A first mobile network comprises a base station 712, a serving radio network controller (SRNC) 714, and a core network 716. A second mobile network comprises a base station 732, a serving radio network controller (SRNC) 734, and a core network 736. An SAS 740 is shared between the first mobile network and the second mobile network. A user equipment 702 is wirelessly connected to the first mobile network and the second mobile network. Referring to FIG. 7B, a schematic diagram of a network-assisted GPS positioning (A-GPS) method for positioning the user equipment 702 according to an embodiment of the invention is shown. The core network 716 of the first mobile network and the core network 736 of the second mobile network first respectively generate requests for positioning the user equipment 702. The SRNC 714 collects first network information about the user equipment 602 in the first mobile network, and sends first network information to the SAS 740. The SRNC 734 collects second network information about the user equipment 602 in the second mobile network, and sends second network information to the SAS 740. The shared SAS 740 then generates A-GPS assistance information according to combination of the first network information and the second network information. Thus, the A-GPS assistance information generated by the shared SAS 740 has a higher precision than that generated by the SAS 156 shown in FIG. 1C. The SRNC 714 then forwards the A-GPS assistance information to the user equipment 702 as supplement to positioning the user equipment 702. Thus, the A-GPS system 700 positions the user equipment 702 with a higher precision than the A-GPS system shown in FIG. 1C.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for positioning a user equipment, comprising:
   establishing a plurality of wireless links between the user equipment and a plurality of mobile networks;
   obtaining a plurality of first location information sets describing a location of the user equipment from the mobile networks through the wireless links;
   converting the first location information sets to a plurality of second location information sets with a predetermined format;
   combining the second location information sets to estimate a third location information set describing the location of the user equipment; and
   utilizing the third location information set for a location related application,
   wherein each of the second location information sets comprises longitude information, latitude information, altitude information, and at least one of radius information and accuracy information; and the radius information defines spherical probable location region of the user equipment and the accuracy information defines probability of the corresponding second location information set.

2. The method as claimed in claim 1, wherein the mobile networks generate the first location information sets according to a cell-identity algorithm, an observed time difference of arrival (OTDOA) algorithm, an uplink-time difference of arrival (UTDOA) algorithm, or a network-assisted GPS positioning (A-GPS) algorithm.

3. The method as claimed in claim 1, wherein combination of the second location information sets comprises:
   determining an overlapped region of the spherical probable location regions defined by the second location information sets; and
   outputting the overlapped region as a third location information set.

4. The method as claimed in claim 1, wherein combination of the second location information sets comprises:
   weighting the longitude information, the latitude information, and the altitude information of the second location information sets according to the accuracy information of the corresponding second location information sets to obtain the weighted location information sets; and
   averaging the weighted location information sets to obtain the third location information set.

5. The method as claimed in claim 1, wherein the method further comprises:
   making the mobile networks generate a plurality of first network information sets about the user equipment;
   combining the first network information sets to generate a second network information set about the user equipment; and
   requesting a Stand-Alone Serving-mobile-location-center (SAS) of one of the mobile networks to provide a fourth location information set describing the location of the user equipment according to the second network information set.

6. The method as claimed in claim 1, wherein the method further comprises:
   sharing a Stand-Alone Serving-mobile-location-center (SAS) between the mobile networks;
   making the mobile networks send a plurality of first network information sets about the user equipment to the SAS; and
   requesting the SAS to provide a fourth location information set describing the location of the user equipment according to the first network information sets.

7. The method as claimed in claim 1, wherein the mobile networks are public land mobile networks (PLMN).

8. The method as claimed in claim 1, wherein the user equipment is a cell phone, a notebook, or a personal digital assistant (PDA).

9. A user equipment, capable of accessing a plurality of mobile networks, comprising:
   a plurality of location information generating modules, establishing a plurality of wireless links between the user equipment and the mobile networks, and obtaining a plurality of first location information sets describing a location of the user equipment from the mobile networks through the wireless links; and
   an information combination module, coupled to the location information generating modules, converting the first location information sets to a plurality of second location information sets with a predetermined format, and combining the second location information sets to estimate a third location information set describing the location of the user equipment,
   wherein each of the second location information sets comprises longitude information, latitude information, altitude information, and at least one of radius information and accuracy information; and the radius information defines spherical probable location region of the user equipment and the accuracy information defines probability of the corresponding second location information set.

10. The user equipment as claimed in claim 9, wherein the mobile networks generate the first location information sets according to a cell-identity algorithm, an observed time difference of arrival (OTDOA) algorithm, an uplink-time difference of arrival (UTDOA) algorithm, or a network-assisted GPS positioning (A-GPS) algorithm.

11. The user equipment as claimed in claim 9, wherein the information combination module determines an overlapped region of the spherical probable location regions defined by the second location information sets, and outputs the overlapped region as a third location information set, thus combining the second location information sets.

12. The user equipment as claimed in claim 9, wherein the information combination module combines the second location information sets by weighing the longitude information, the latitude information, and the altitude information of the second location information sets according to the accuracy information of the second location information sets to obtain the weighted location information sets, and averaging the weighted location information sets to obtain the third location information set.

13. The user equipment as claimed in claim 9, wherein the mobile networks generate a plurality of first network information sets about the user equipment, a radio network controller of a predetermined mobile network selected from the mobile networks combines the first network information sets to generate a second network information set about the user equipment, and a Stand-Alone Serving-mobile-location-center (SAS) of the predetermined mobile network then provides a fourth location information set describing the location of the user equipment according to the second network information set.

14. The user equipment as claimed in claim 9, wherein the mobile networks share a Stand-Alone Serving-mobile-location-center (SAS), the mobile networks send a plurality of first network information sets about the user equipment to the SAS, and the SAS then provides a fourth location information set describing the location of the user equipment according to the first network information sets.

15. The user equipment as claimed in claim 9, wherein the mobile networks are public land mobile networks (PLMN).

16. The user equipment as claimed in claim 9, wherein the user equipment is a cell phone, a notebook, or a personal digital assistant (PDA).

* * * * *